(12) United States Patent
Katsurabayashi et al.

(10) Patent No.: US 7,461,789 B2
(45) Date of Patent: Dec. 9, 2008

(54) ELECTRONIC DOCUMENT MANAGEMENT SYSTEM, IMAGE FORMING DEVICE, METHOD OF MANAGING ELECTRONIC DOCUMENT, AND PROGRAM

(75) Inventors: Hiroshi Katsurabayashi, Kanagawa (JP); Shinichi Miyamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 446 days.

(21) Appl. No.: 11/259,056

(22) Filed: Oct. 27, 2005

(65) Prior Publication Data
US 2006/0283949 A1    Dec. 21, 2006

(30) Foreign Application Priority Data
Jun. 15, 2005   (JP)   ............. P2005-175423

(51) Int. Cl.
G06K 7/10   (2006.01)
G06K 7/14   (2006.01)
(52) U.S. Cl. ............... 235/454; 235/494; 235/435
(58) Field of Classification Search .......... 235/454, 235/494, 462.09, 462.1, 432, 435; 358/1.12
See application file for complete search history.

(56) References Cited
U.S. PATENT DOCUMENTS
5,943,443 A * 8/1999 Itonori et al. ........... 382/225

2004/0035935 A1 * 2/2004 Takahashi et al. ....... 235/462.09
2007/0045427 A1 * 3/2007 Onishi ..................... 235/494

FOREIGN PATENT DOCUMENTS
JP   A-2003-186238   7/2003
JP   A-2004-094907   3/2004
WO   WO 02/082366 A1   10/2002

* cited by examiner

*Primary Examiner*—Edwyn Labaze
(74) *Attorney, Agent, or Firm*—Morgan, Lewis & Bockius LLP

(57) ABSTRACT

An electronic document management system includes an electronic document management unit that manages a correlation between address information that is printed on a surface of a medium to specify a position of the surface of the medium and an electronic document printed on the medium, and an accumulating unit that accumulates correction information describing a difference between a position of the electronic document on a document image and a position on the medium by a code image describing the address information printed on the surface of the medium together with the electronic document, in connection with the medium. The electronic document management unit inputs reading information of the code image, and corrects position information obtained from the reading information based on the accumulated correction information so that a position of the electronic document on the document image matches with a position on the medium by the code image.

21 Claims, 12 Drawing Sheets

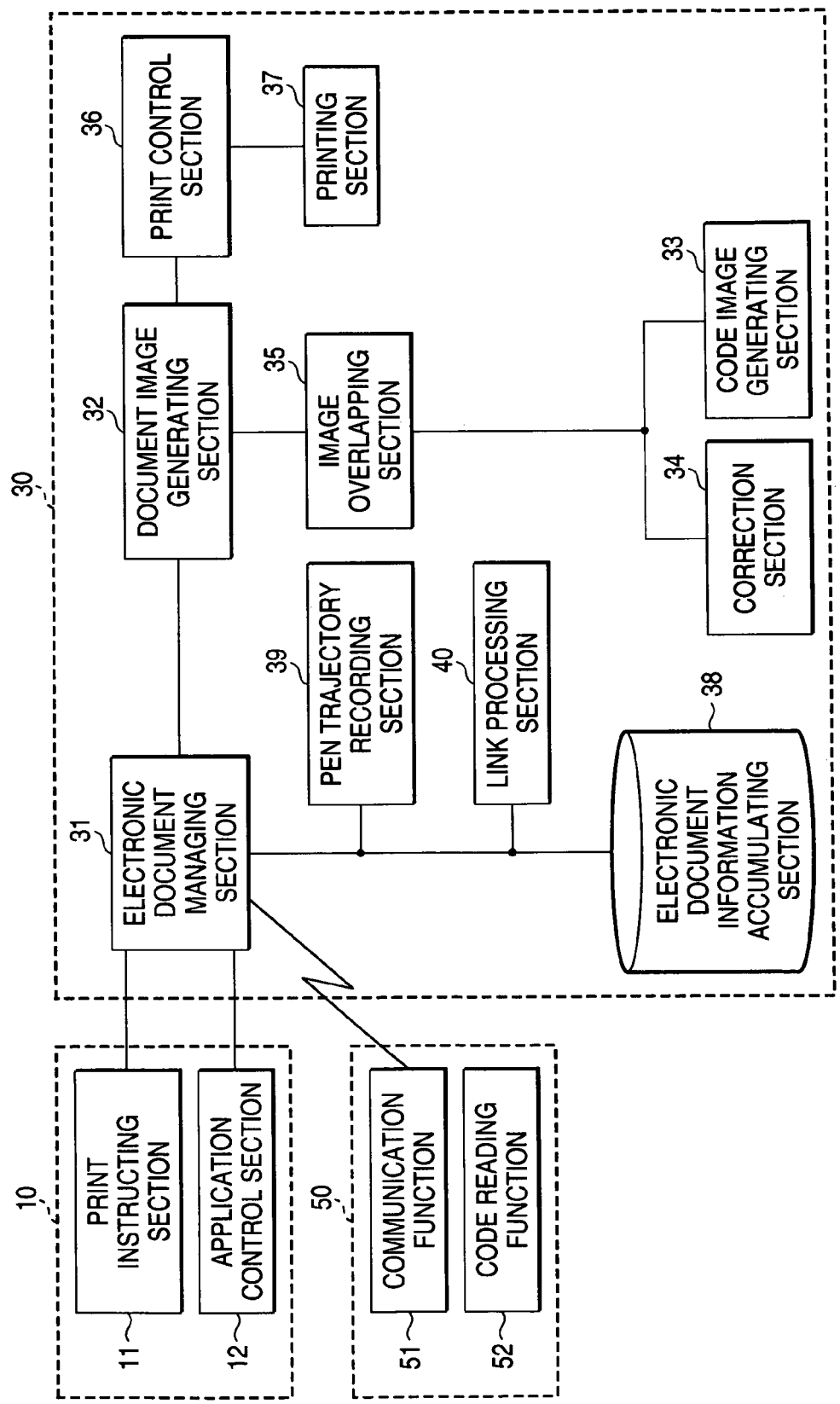

FIG. 2A
FIG. 2B
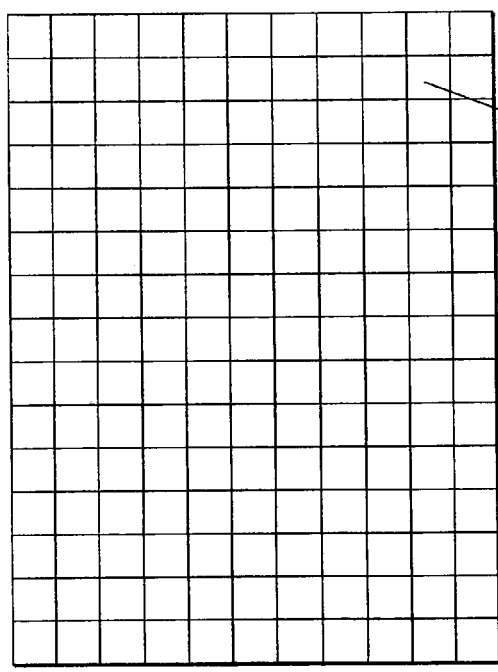
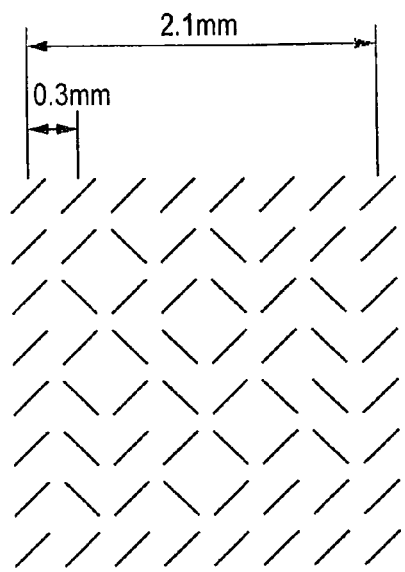

FIG. 8

| MANAGE-MENT ID | ELECTRONIC DOCUMENT NAME | PAGE INFOR-MATION | PRINT-OUT TIME | ELEC-TRONIC DOC-UMENT SIZE | PAPER SIZE | DIREC-TION OF IMAGE | COR-RECTION VALUE (X-DIREC-TION) | COR-RECTION VALUE (Y-DIREC-TION) | MAGNI-FICATION RATIO (%) | N-up INFOR-MATION |
|---|---|---|---|---|---|---|---|---|---|---|
| 1 | docserver1.fujixerox.co.jp/Cabinet1/drawer1/folder1/document1.ppt | 1 | 2005/1/1 10:10:15 | A4 | A4 | LENGTH | 4.6 | 4.3 | 100 | 1 |
| 2 | docserver1.fujixerox.co.jp/Cabinet1/drawer1/folder1/document1.ppt | 2 | 2005/1/1 10:10:16 | A4 | A4 | LENGTH | 4.6 | 4.6 | 100 | 1 |
| 3 | docserver1.fujixerox.co.jp/Cabinet1/drawer1/folder1/document1.ppt | 3 | 2005/1/1 10:10:17 | A4 | A4 | LENGTH | 4.6 | 4.6 | 100 | 1 |
| 4 | docserver1.fujixerox.co.jp/Cabinet1/drawer1/folder1/document1.ppt | 4 | 2005/1/1 10:10:18 | A4 | A4 | LENGTH | 4.6 | 4.6 | 100 | 1 |
| 5 | docserver1.fujixerox.co.jp/Cabinet1/drawer1/folder1/document1.ppt | 5 | 2005/1/1 10:10:19 | A4 | A4 | LENGTH | 4.6 | 4.6 | 100 | 1 |
| 6 | docserver1.fujixerox.co.jp/Cabinet1/drawer1/folder1/document1.ppt | 6 | 2005/1/1 10:10:20 | A4 | A4 | LENGTH | 4.6 | 4.6 | 100 | 1 |
| 7 | docserver1.fujixerox.co.jp/Cabinet1/drawer1/folder1/document2.ppt | 1 | 2005/1/1 10:10:21 | A4 | A4 | WIDTH | 15 | 10 | 100 | 1 |
| 8 | docserver1.fujixerox.co.jp/Cabinet1/drawer1/folder1/document2.ppt | 2 | 2005/1/1 10:10:22 | A3 | A3 | WIDTH | 15 | 10 | 100 | 1 |
| 9 | docserver1.fujixerox.co.jp/Cabinet1/drawer1/folder1/document3.ppt | 1 | 2005/1/1 10:10:23 | A3 | A4 | LENGTH | 15 | 10 | 70 | 2 |
| 10 | docserver1.fujixerox.co.jp/Cabinet1/drawer1/folder1/document3.ppt | 2 | 2005/1/1 10:10:24 | A3 | A4 | LENGTH | 15 | 155 | 70 | 2 |

ELECTRONIC DOCUMENT MANAGEMENT SYSTEM, IMAGE FORMING DEVICE, METHOD OF MANAGING ELECTRONIC DOCUMENT, AND PROGRAM

BACKGROUND OF THE INVENTION

1. Field of the Invention the present invention relates to an image forming device, such as a copier or a printer, to an electronic document management system that manages electronic documents to be printed by such an image forming device.

2. Description of the Related Art recently, a technique is attracting attention in which characters or images handwritten by a user on a special paper with minute dots printed thereon are read as electronic information (data). The data can be sent to a personal computer or a mobile phone to be stored or preserved in a storage device, such as a magnetic disk device, or to be sent by e-mail. With this technique, small dots are printed on the special paper, for example, at intervals of about 0.3 mm, such that different patterns can be drawn, for example, for each grid having a predetermined size. The patterns can represent position information such as an address or the like. Accordingly, it is possible to specify a position or trajectory of a pen point on the special paper by reading the patterns, for example, using a special ball-point pen equipped with an optical reading unit, such as a digital camera. In addition, information concerning the position or trajectory of the pen point can be processed so that the characters or images handwritten on the paper can be used as electronic information.

As techniques according to the related art, various techniques have been proposed, such as a technique of printing a pattern on a paper, a technique of reading the pattern on the paper, and the like. As the technique of forming a pattern on a paper, a technique has been known in which a two-dimensional code pattern to be printed together with a document on demand using a typical general-purpose printer is provided. According to the technique described above, a two-dimensional code is printed all over the paper, together with a document, using a typical general-purpose printer. A document management database is referred to receive a document page ID for each page of the document to be printed, such that a two-dimensional code is generated as a two-dimensional code pattern for a document page to be printed. Position information that is represented with the two-dimensional code is assigned among position information that is collectively managed in advance.

In addition, as another related technique of forming a pattern on a paper, a technique has been known in which a computer unit generates boundary information for describing the boundary of sections in the overall position coding pattern, and a printer unit generates and prints figure information for describing a pattern based on the boundary. The technique also has been known that overlapping a generated pattern (figure information) and visual information to print it.

However, when a code pattern representing coordinates for specifying a position on a plane is formed on a paper, the code pattern and visual information, i.e., an image of an electronic document, may be overlapped and then printed. For example, in a document in which a prescribed form is printed and handwritten content is recorded on a surface of a paper, handwritten characters or images are obtained as electronic information. Examples of such an application include a medical examination and treatment chart, an exam paper, or the like.

When such an electronic document is printed, the margin of a paper is set to designate the format of the electronic document, or an N-up print for printing plural pages on a single paper is made. However, in such a system that the code pattern and the electronic document are overlapped and printed, when the margin setup or N-up print is made at the time of printing the electronic document, there is a problem in that a coordinate origin on the paper specified by the code pattern and a coordinate origin identified by an application that processes electronic information of the handwritten image do not match each other.

In addition, when an image is magnified or reduced to print an electronic document, the position of the image on the electronic document and the position of an actual image printed on the paper are different from each other. As a result, there is a problem in that when the handwritten image is recognized, the position obtained from reading information of the code pattern and the position identified by an application do not match each other.

SUMMARY OF THE INVENTION

The present invention has been made in view of the above circumstances and provides an electronic document management system.

According to an aspect of the present invention, an electronic document management system includes an electronic document management unit that manages a correlation between address information that is printed on a surface of a medium to specify a position of the surface of the medium and an electronic document, the electronic document being printed on the medium, and an accumulating unit that accumulates correction information in connection with the medium, the correction information describing a difference between a position of the electronic document on a document image and a position on the medium by a code image describing the address information printed on the surface of the medium together with the electronic document. The electronic document management unit inputs reading information of the code image, and corrects position information obtained from the reading information based on the correction information accumulated in the accumulating unit so that a position of the electronic document on the document image matches with a position on the medium by the code image.

According to another aspect of the present invention, an electronic document management system includes a receiving unit that receives a print instruction to print an electronic document, an electronic document management unit that manages a correlation between address information that is printed on a surface of a medium to specify a position of the surface of the medium and a electronic document, the electronic document being printed on the medium, a code image generating unit that generates a code image printed on the medium based on the address information, a correction unit that generates correction information describing a difference between a position of the electronic document on a document image and a position on the medium by the code image, with respect to the code image generated by the code image generating unit, an accumulating unit that accumulates information managed by the electronic document management unit and the correction information generated by the correction unit, and a printing unit that prints the generated code image and an image of the electronic document on the surface of the medium.

According to another aspect of the present invention, an image forming device includes a code image generating unit that generates a code image printed on a medium based on address information for specifying a position of a surface of the medium on which an electronic document is printed, a correction unit that generates correction information describing a difference between a position of the electronic document on a document image and a position on the medium by the code image, with respect to the code image generated by the code image generating unit, and a printing unit that prints the generated code image and an image of an electronic document in which the correction information is generated, on the surface of the medium.

According to another aspect of the present invention, an electronic document management method includes reading a code image that is printed on a surface of a medium together with an electronic document, and describes at least address information for specifying a position of the surface of the medium, the electronic document being printed on the medium, inputting reading information of the code image to acquire position information from the reading information, correcting the position information based on correction information that describes a difference between a position of the electronic document on a document image and a position on the medium by the code image so that the position on the document image and the position on the medium by the code image match each other, and reflecting the corrected position information in the electronic document.

According to another aspect of the present invention, a storage medium readable by a computer, the storage medium storing a program of instructions executable by the computer to perform a function, the function comprising the steps of managing a correlation between address information that is printed on a surface of a medium to specify a position of the surface of the medium and the electronic document, the electronic document being printed on the medium, accumulating correction information in connection with the medium, the correction information describing a difference between a position of the electronic document on a document image and a position on the medium by a code image describing the address information printed on the surface of the medium together with the electronic document, and inputting reading information of the code image to correct position information obtained from the reading information based on the accumulated correction information so that a position of the electronic document on the document image matches with a position on the medium by the code image.

BRIEF DESCRIPTION OF THE DRAWINGS

Embodiments of the present invention will be described in detail based on the following figures, wherein:

FIG. 1 is a diagram showing the overall configuration of an electronic document management system to which an embodiment of the invention is applied;

FIGS. 2A and 2B are diagrams illustrating a code image (two-dimensional code) according to the embodiment of the invention;

FIG. 8 is a diagram showing a data structure for managing the correlation between an electronic document and medium identification information, and information concerning a printing condition, which are used in the embodiment of the invention;

DETAILED DESCRIPTION OF THE INVENTION

Figure 3:
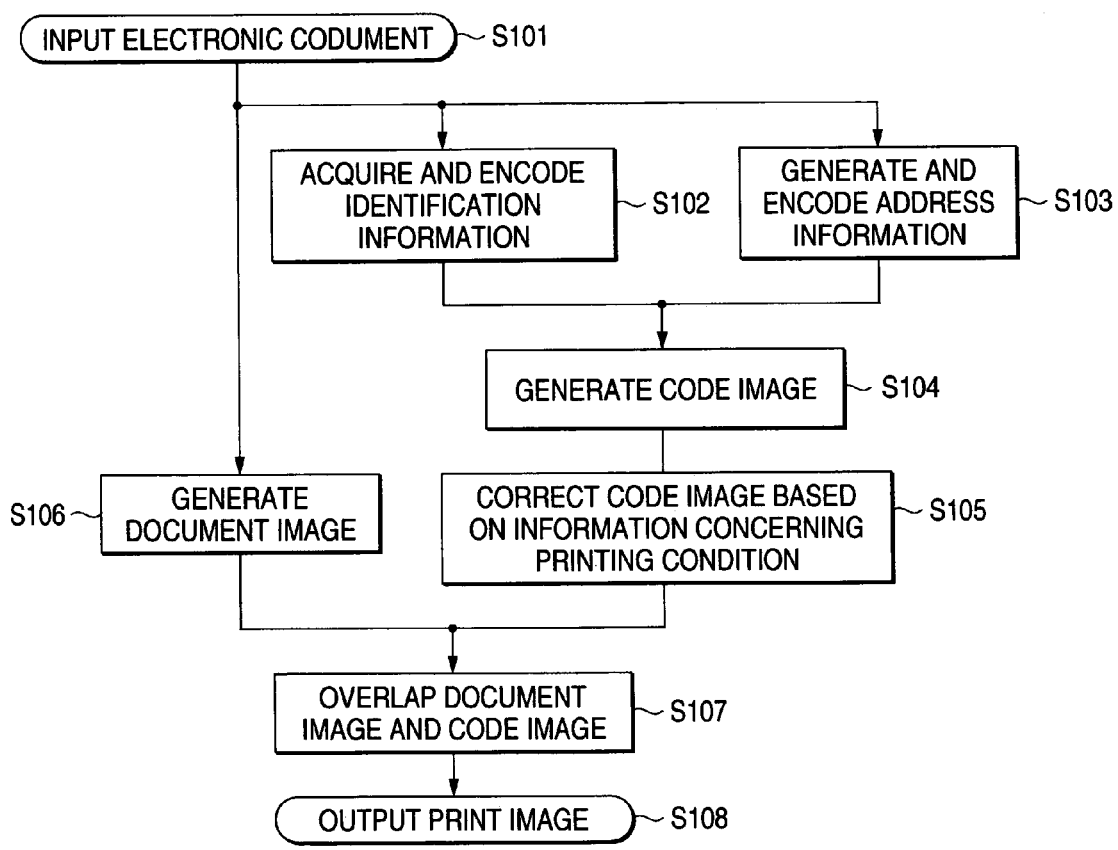
FIG. 3 is a flow chart showing a process of outputting an image which is executed by a printing device according to the embodiment of the invention.

Embodiments according to the invention will now be described in detail with reference to the accompanying drawings.

An outline of the invention will now be given. According to the invention, in a technique of forming a code pattern that represents coordinates for specifying a position on a printed medium such as a paper or the like, the code pattern and an image of the electronic document (hereinafter referred to as "document image") are overlapped and then printed. When the margin setup, N-up print, or the magnification/reduction of a document image is made at the time of printing the electronic document, a position on the medium specified by the code pattern and a position on the electronic document (i.e., the position of data on the electronic document) identified by an application that processes electronic information of a handwritten image do not match each other. In the invention, the difference between the position on the medium specified by the code pattern and the position on the electronic document identified by the application processing the electronic information of the handwritten image is corrected based on the information concerning the printing condition (the margin setup, the number of sheets of electronic document printed on a single medium, the magnification ratio, or the like).

On the other hand, by using the technique of inputting a handwritten image using the position information on the medium that is represented by the code pattern formed on the printed medium, the electronic document printed on the printed medium and the application that gives a predetermined function to the electronic document are operatively connected to each other. For example, when a predetermined frame printed on a medium is checked, a function of the application corresponding to the frame operates, as though a mouse is clicked on the electronic document displayed on a display device. In this case, the position at which the frame is printed on the medium is actually connected with the function of the application. When the frame is checked by a pen that is a reading device of the code pattern, information concerning the checked position is read and the corresponding function of the application operates based on the information.

In order to execute such a technique, the position on the medium specified by the code pattern and the position on the electronic document identified by the application processing the electronic information of the handwritten image should match each other. Accordingly, embodiments according to the invention will now be described in detail.

FIG. 1 is a diagram showing the overall configuration of an electronic document management system to which an embodiment of the invention is applied.

The electronic document management system shown in FIG. 1 includes a personal computer (PC) 10 that instructs to print electronic documents, a printing device 30 that prints the electronic documents on a medium, such as a paper or the like, and a pen-type input device 50 that reads address information concerning the medium on which the electronic document is printed by the printing device 30 or the like.

The personal computer 10 includes a print instructing section 11 that instructs the printing device 30 to print, and an application control section 12 that controls the operation of an application providing functions for a printed document. Although the print instructing section 11 and the application control section 12 are provided in the same personal computer 10 in FIG. 1, they may be separately provided in different PCs such as a print instructing PC and an application providing PC.

The print instructing section 11, for example, instructs to print electronic documents stored in an external electronic document database (document repository). The electronic document repository is, for example, specified by URLs (Uniform Resource Locators). When instructing to print the documents, the print instructing section 11 instructs to set the magnification ratio for magnifying/reducing an image, the margin setup, or N-up print mode. In the N-up print mode, the number of sheets of the electronic document printed on a single sheet of medium is specified.

When any operation is performed on a medium on which an electronic document and the following code pattern are printed (for example, when a user taps on any specific position on the medium using the pen-type input device 50), the application control section 12 sends the same event as opening a document with an existing application for document editing, designating a position with a mouse, and pressing a mouse button, and operates the application.

The printing device 30 includes an electronic document managing section 31 that manages the correlation between a generated address and an electronic document, and a document image generating section 32 that generates a document image from the electronic document managed in the electronic document managing section 31. The printing device 30 further includes a code image generating section 33 that generates a code image describing information concerning consecutive address information to be printed on a medium by a predetermined code pattern and medium identification information, a correction section 34 that corrects information concerning the code image (code information) based on a printing condition of the electronic document, and an image overlapping section 35 that overlaps the document image generated by the document image generating section 32 and the code image generated by the code image generating section 33 to each other to generate a final image (hereinafter referred to as "print image"). Also, the printing device 30 includes a print control section 36 and a printing section (image forming section) 37 for printing the image generated by the image overlapping section 35. Also, the printing device 30 includes an electronic document information accumulating section 38 that accumulates the electronic document and information concerning a printing condition of the electronic document, a pen trajectory recording section 39 that records a pen trajectory made by a user, and a link processing section 40 that performs processes based on link information set on the electronic documents. The above-mentioned components constituting the printing device 30 are executed by CPU (Central Processing Unit) and a memory device, which are not shown and program-controlled. A program that controls the CPU is stored in a non-volatile memory such as a ROM or the like. Examples of the memory device include a magnetic disk device, a RAM, a semiconductor memory, or the like.

The electronic document managing section 31 manages the correlation between a printed electronic document and information concerning a printing condition of the electronic document. The information concerning the printing condition includes information concerning the magnification ratio, the margin of a medium, and N-up print mode at the time of printing, the size of the printed medium, and a correction value of the coordinate origin of a code image that is calculated based on the above information. In addition, the electronic document managing section 31 acts as an electronic document acquisition unit that acquires data of an electronic document to be printed, or a receiving unit that receives a print instruction from the print instructing section 11 of the personal computer 10.

The document image generating section 32 generates a document image (image data) to be actually printed on a medium based on data (document, image, or the like) of the electronic document to be printed and information concerning the above-mentioned printing condition.

The code image generating section 33 generates a code image (two-dimensional code) that describes address information (information for specifying a position on the medium) that is set on the medium using a predetermined code pattern. Examples of the code pattern used for the code image include a slant line pattern, such as slash '/' or backslash '\', and a dot pattern. On an image having a size corresponding to the medium, two-dimensional codes that store different address information are arranged in a lattice shape. In addition, the code information represented by the code image includes information for specifying a position having a planar shape. The code information may include identification information of the electronic document, print date and time, identification information of a printing machine, and counter information of the printing machine (e.g., the accumulated number of sheets of a paper printed by the printing machine).

The correction section 34 corrects the code information generated by the code image generating section 33 based on information concerning the printing condition of the electronic document managed by the electronic document managing section 31. That is, the correction section 34 matches the position on a medium specified by a code pattern and the position on a screen identified by an application processing electronic information of a handwritten image each other, which will be described below in detail.

The image overlapping section 35 overlaps the document image of the electronic document generated by the document image generating section 32 and the code image generated by the code image generating section 33 and corrected by the correction section 34 each other to generate a print image. In a document in which a prescribed form is printed and handwritten content is recorded on a surface of a paper, a region (write region) on which characters or images are recoded on the surface of the paper may be restricted. In such a document, in order to input handwritten characters or images, the code image may be formed only on the write region. Accordingly, the image overlapping section 35 arranges the code image to cover all over the surface of the medium, or arranges the code image partly only in a specific region according to the type or use of outputted document.

The print control section 36 controls the printing section 37 according to a printing condition, such as information concerning the margin setup, the size of the printed medium, or the number of copies. The information concerning the printing condition is acquired from the electronic document information accumulating section 38.

The printing section 37 prints a print image refined in the image overlapping section 35 (that is, forms an image), for example, by an electronic photography method on the medium, under the control of the print control section 36. A detailed configuration of the printing section 37 will be described below.

The electronic document information accumulating section 38 stores information concerning the printing condition (the magnification ratio, the margin, N-up print, the number of copies, or the like) specified when a print instruction is sent from the print instructing section 11 of the personal computer 10, and corrected content (a correction value of the coordinate specified by the code pattern) by the correction section 34. As described above, the electronic document managing section 31 manages the correlation between the information by correlating with the printed electronic document printed by the electronic document managing section 31. A data structure of data stored in the electronic document information accumulating section 38 will be described below.

The pen trajectory recording section 39 interprets a moving trajectory of the pen-type input device 50 based on the position information contained in the code information and records the information concerning the trajectory of the pen-type input device 50. However, as described below, when the pen-type input device 50 has a function of interpreting the moving trajectory, the pen trajectory recording section 39 records the trajectory information transmitted from the pen-type input device 50 without interpreting the moving trajectory. In addition, the pen trajectory recording section 39 controls to overlap with a corresponding original electronic document and to display it on a display device (not shown). Accordingly, it is possible to represent a stroke written on the medium on the electronic document visually on the display device.

When link information is already set on a specified position of an original electronic document, the link processing section 40 has a corresponding table indicating the correlation between the position, URL, and a start program. For example, when a position with a link attached thereto is designated by the pen-type input device 50, the link processing section 40 recognizes by position information interpreted from code information that the link is designated. Next, the link processing section 40 can open a homepage of the designated URL or run programs on a browser based on the corresponding table. In addition, when recognizing that the link is designated, the link processing section 40 converts the position information on the medium interpreted from the code information to the position on the electronic document, based on the information stored in the electronic document information accumulating section 38.

The pen-type input device 50 has a communication function 51 that communicates with external devices, such as the printing device 30, and a code reading function 52 that optically reads the code image (two-dimensional code) printed on the medium. In the electronic document management system shown in FIG. 1, a direct communication is performed between the pen-type input device 50 and the printing device 30.

The communication function 51 transmits code information concerning the medium read by the code reading function 52. The communication can be made by accessing an interface, such as a USB (Universal Serial Bus), RS-232C or the like, via a cable. In addition, the communication can be made using a wireless LAN, Bluetooth or the like.

FIGS. 2A and 2B are diagrams illustrating two-dimensional code images which are generated by the code image generating section 35 of the printing device 30 and are printed by the printing section 37. FIG. 2A is a diagram showing a unit of a code image in a matrix. FIG. 2B is a diagram showing a single unit of a two-dimensional code image in which a non-visible image is recognized by irradiating infrared light.

The code image formed by the printing section 37 is formed by a non-visible toner which has a maximum absorption ratio of, for example, 7% or less, in a visible light region (400 to 700 nm), and has an absorption ratio of, for example, at least 30% in a near-infrared region (800 to 1000 nm). Also, the non-visible toner having an average dispersion diameter of 100 to 600 nm is used to improve capability of absorbing the near-infrared light required for mechanical reading of an image. In this case, the term 'visible' and the term 'non-visible' have no relation to whether it can be recognized through the naked eye. The term 'visible' and the term 'non-visible' are distinguished according to whether or not an image formed on a printed medium can be recognized according to a color-forming property due to the absorption of a specified wavelength in a visible light region. Also, a method of forming an image using the non-visible toner is disclosed in JP-A-2003-186238.

The code images shown in FIGS. 2A and 2B are formed in non-visible images. For the non-visible image, a mechanical reading process by infrared light irradiation and a decoding process can be stably performed over a long period, such that high-density information can be recorded. Also, apart from a region in which a visible image is provided on a surface of a medium to which the image is output, the non-visible image can be provided in any region. In the present embodiment, the non-visible image is formed on the entire surface (space) of a medium to fit to the size of the printed medium, irrespective of the explanation concerning the above-mentioned image overlapping section 35. However, the term 'the entire surface' does not imply that four corners of a paper are included. In a device employing an electro-photographic method, the circumference of a surface cannot be usually printed. Accordingly, it is not necessary to print the non-visible image in such a range.

A two-dimensional code pattern shown in FIG. 2B is made of plural minute lint bitmaps having different rotational angles. More specifically, bit 0 and bit 1 are represented using the slash '/' and backslash '\' which are different in gradient from each other. For example, the slash '/' represents bit 0 while the backslash '\' represents bit 1. With the minute line bitmap consisting of the two kinds of gradient, it is possible to provide a two-dimensional code pattern. By using the two-dimensional code pattern, noise affecting on a visible image is extremely small, and a large amount of information can be embedded with high density. A unit of the minute line has eight dots, each having an interval of 0.3 mm, which results in the size of a unit being about 2.1 mm. Also, a unit of the minute line preferably has three to ten dots. If a unit has too small dots, the amount of information is little. On the contrary, if a unit has more than ten dots, there is a problem in that noise occurs in a visible image.

In the two-dimensional code formed in such a manner, coded medium identification information and coded address information are stored. As shown in FIG. 2A, the two-dimensional codes in which different address information is stored are arranged in a grid shape on the entire page (space) of the medium to fit to the size of the medium to be printed.

FIG. 3 is a flow chart showing an image output process executed by the printing device 30 shown in FIG. 1.

Referring to FIG. 3, the electronic document managing section 31 of the printing device 30 inputs electronic documents based on instructions from the print instructing section 11 of the personal computer 10 (Step S101). At this time, information concerning the printing condition of the electronic document is also input. The inputted electronic documents may be acquired, for example, from a repository connected to a network using the URL. Also, the electronic document maybe accumulated in an electronic document accumulating section (not shown) of the printing device 30, or may be received directly from the personal computer 10 whenever printing is performed. Moreover, the term 'electronic document' is not limited to 'document' or text information but includes images, such as pictures, photos and figures, bitmap images, or other print information.

The code image generating section 33 having obtained input information of electronic document from the electronic document managing section 31 acquires and encodes printing medium identification information (Step S102). Next, the code image generating section 33 having obtained the input information of the electronic document from the electronic document managing section 31 generates and encodes address information concerning consecutive address information to be printed on one surface of the medium to fit to the size of the printed medium (Step S103). In the step S103, addresses are generated to fit to the size of the medium to be printed, for example, A4-sized, A3-sized, B5-sized, B4-sized document, or the like.

In order to magnify or reduce the size of the inputted electronic document, the address corresponding to the medium is changed in accordance with the magnification ratio. At this time, for example, when an A4-sized electronic document is reduced to an A5-sized electronic document and then is output on an A4-sized medium, the remaining part becomes a margin. The margin may be assigned with consecutive addresses. Alternatively, the remaining part may remain a margin without forming an image using a non-visible toner.

Subsequently, the code image generating section 33 generates code images describing the medium identification information and the address information encoded in the steps S102 and S103 using the two-dimensional code pattern explained with reference to FIGS. 2A and 2B (Step S104). The correction section 34 acquires information concerning the printing condition from the electronic document managing section 31 and corrects the code image generated in the step S104 if necessary (Step S105).

On the other hand, the document image generating section 32 converts the electronic document to be printed into an image to generate a document image (Step S106). For example, when images are expanded in a page memory, input color signals of R (red), G (green), and B (blue) are converted into printed color signals of Y (yellow), M (magenta), C (cyan), and K (black).

Subsequently, the image overlapping section 35 overlaps the code image generated in the step S104 and corrected in the step S105, and the document image generated in the step S106 each other to generate the print image (Step S107). The print control section 36 outputs the print image generated by the image overlapping section 35 to the printing section 37 (Step S108).

Figure 4:
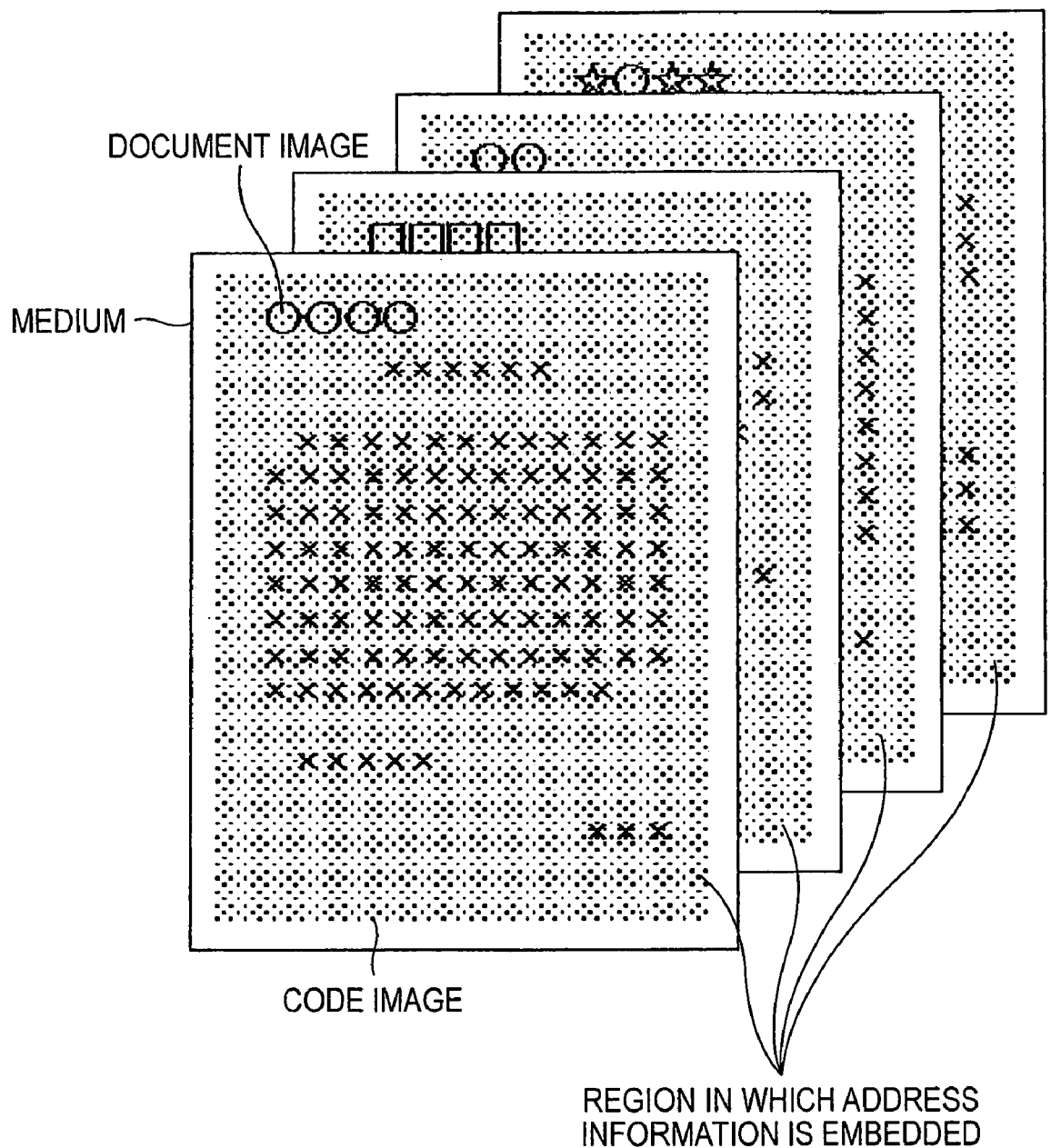
FIG. 4 is a diagram showing an example of a print image including a code image according to the embodiment of the invention.

FIG. 4 is a diagram showing an example of a print image including the code image obtained in such a manner.

As shown in FIG. 4, a document image formed by a visible toner and a code image formed by a non-visible toner overlap to be printed out on a surface of a medium (image output medium). A region in which address information is embedded is formed by the code image. As described above, the address information is distributed on a surface of the medium to fit to the size of the printed medium. The code image representing the address information is formed on the entire surface of the medium. Also, in the present embodiment, the medium identification information contained in the code image is different for each medium. Accordingly, although the electronic documents are the same, different identification information is added according to pages and the number of copies when plural pages or plural copies are printed. That is, even when the same electronic document is printed, contents of the code images are different for each medium.

As described above, the code image (non-visible image using the non-visible toner) may not be formed on part of the medium. For example, when a photographic image is included in the printed electronic document, if the photographic image needs not to be contaminated, a process of printing a non-visible image using a non-visible toner cannot be performed on a region in which the photographic image is recognized to be formed. It is preferable that a user can select whether or not to perform such a process by providing a user interface to allow the user to make a selection. Also, in order to recognize a photographic image part from an electronic document, a text/image separation (T/I separation) technique which is performed in a related art image process may be used. Here, a detailed description thereof will be omitted.

Figure 5:
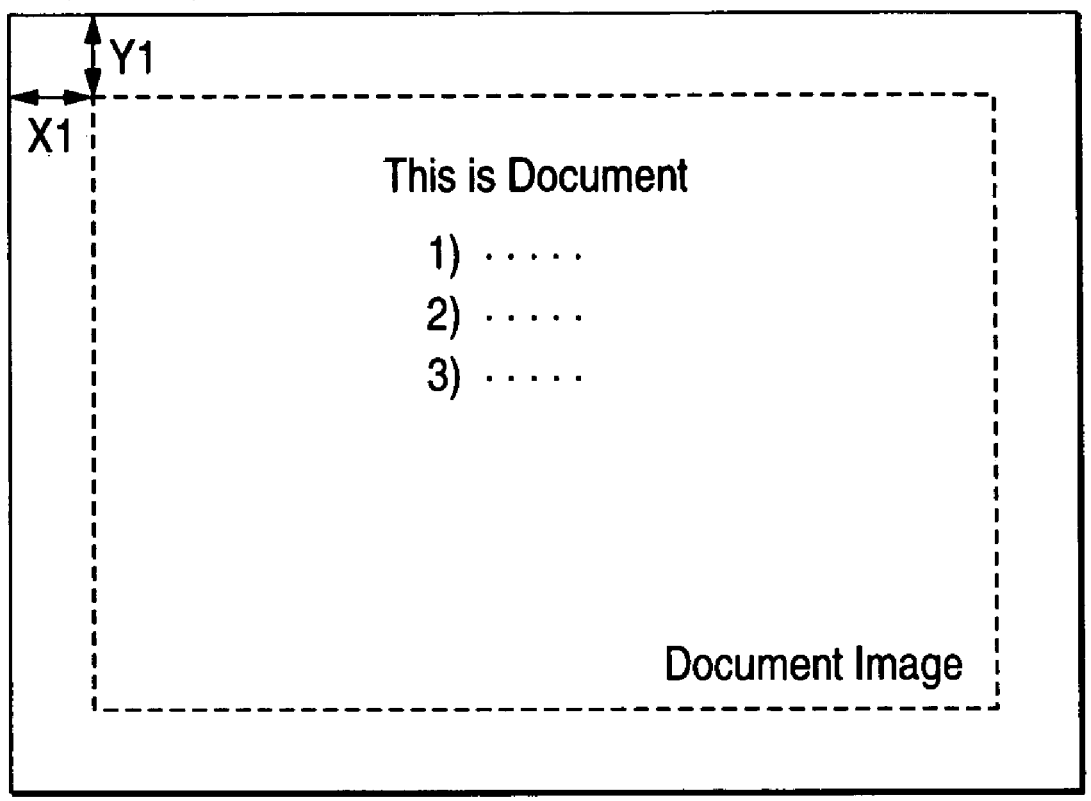
FIG. 5 is a diagram showing a correction method when the margin setup or the magnification or reduction of an electronic document is made by a correction unit according to the embodiment.
Figure 6A:
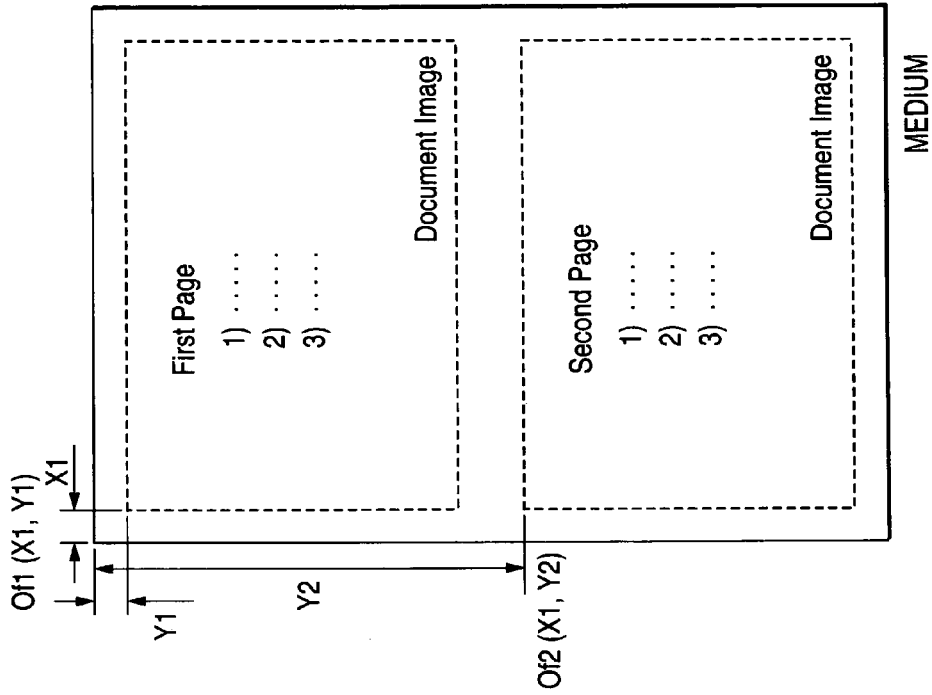
FIGS. 6A and 6B are diagrams showing a correction method when the N-up print is made by the correction unit according to the embodiment.
Figure 6B:
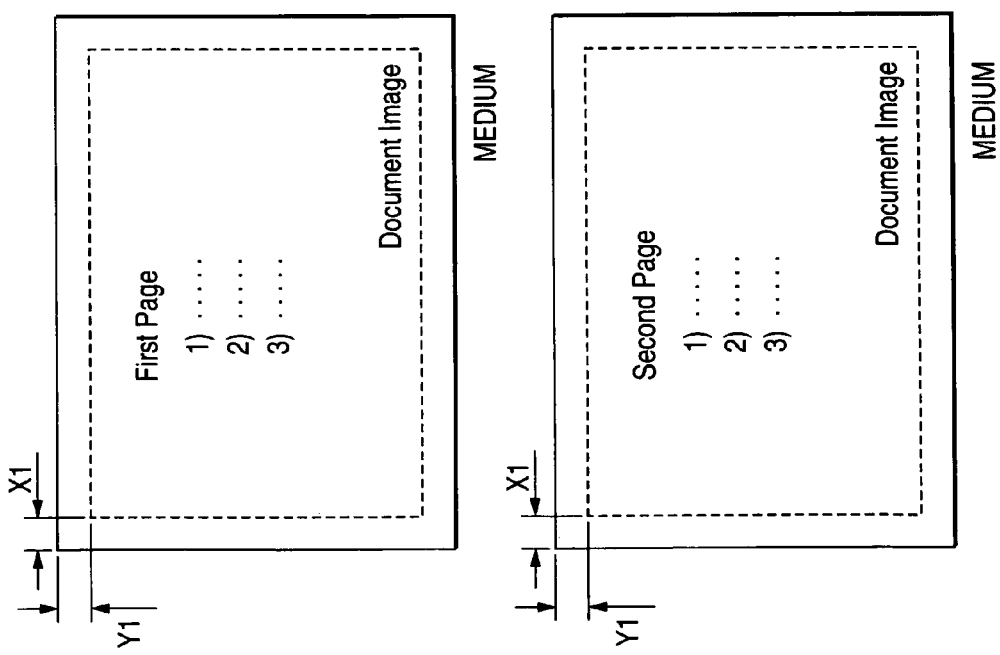

FIGS. 5 to 6B are diagrams showing a method of correcting a code image using the correction section 34. FIG. 5 is a diagram showing a correction method when the margin setup or the magnification or reduction of an electronic document is made. FIGS. 6A and 6B are diagrams showing a correction method when the N-up print is made.

In the present embodiment, addresses are represented in X-Y coordinates in which the top-left corner is the origin, the transverse direction is X-direction, and the longitudinal direction is Y-direction (even when another point (for example, bottom-left corner) other than the top-left corner is set to the origin, the following description is effective). Accordingly, when an address is assigned on the entire surface of a medium to form a code image, the top-left corner of the code image becomes the origin in the medium. On the other hand, the top-left corner of the document image becomes the origin in the electronic document. That is, the origin of address in the code image and the origin of address in the electronic document are independently defined. Accordingly, when the margin setup or the magnification or reduction of an electronic document is made at the time of printing the electronic document on the medium, if addresses are assigned on the entire surface of the medium to form a code image, the position of the origin on the medium and the position of the origin on the document image do not match each other.

In FIG. 5, the medium is represented by a solid line, the document image is a region surrounded by a dotted line, and the circumferential region of the document image indicates the margin. In the drawing, the margin with Y1 and X1 is set on the medium (Of1). Accordingly, the origin of the document image is identical to the coordinate (X1, Y1) on the medium, which is represented by the code image. As a result, the position (address) on the document image identified by an application that provides a function for the document image is deviated by X1 toward the X-direction and by Y1 toward the Y-direction from the address on the medium that is represented by the code image. Accordingly, the correction section 34 corrects address information of the code image generated by the code image generating section 33 into address information based on the margin setup. In more detail, a correction value is generated such that the coordinate (X1, Y1) in the code image is regarded to be the origin. As described above, the generated correction value is stored in the electronic document information accumulating section 38 and managed by the electronic document managing section 31.

Even when the margin is generated on the medium by making a reduction of the document image, the same correction operation may be performed. That is, from the magnification ratio and arrangement information of the document image on the medium, the amount of difference between the position of the origin on the medium and the position of the origin on the document image is calculated. In addition, a correction value of the address information of the code image is generated so that the origin on the medium and the origin on the document image can match each other.

On the other hand, when making a magnification of the document image, the margin as shown in FIG. 5 is not generated on the medium. However, in this case, since the document image is beyond the range of the medium, the position of the origin on the medium and the position of the origin on the document image may not match each other. In this case, the correction section 34 calculates the amount of difference between the position of the origin on the medium and the position of the origin on the document image from the magnification ratio and arrangement information of the document image on the medium. In addition, the correction section 34 generates a correction value of the address information of the code image so that the origin on the medium and the origin on the document image can match each other.

In addition, when making a magnification or reduction of the document image, the length of each part in the document image varies according to the magnification ratio in addition to the mismatch of the origin position. As a result, the position on the medium represented by the code image and the position on the document image identified by the application do not match each other. For example, when an A4-sized electronic document is reduced into an A5-sized electronic document, the distance from the origin to a specific position on the document printed on a medium is reduced to about 70% of the distance from the origin to the corresponding position on the original electronic document. Accordingly, in order to reflect a handwritten image recorded on the medium through the pen-type input device 50 in the electronic document, it is necessary to correct the address information of the code image based on the magnification ratio. In more detail, the magnification ratio of the electronic document when it is printed on the medium is stored in the electronic document information accumulating section 38. However, the magnification ratio can use information included in the information concerning the printing condition transmitted together with the print instruction from the personal computer 10.

When making an N-up print of the document image, each page needs to be differently corrected according to the arrangement on the medium. In FIGS. 6A and 6B, 2-up print of an A4-sized electronic document is made on an A4-sized medium. Two pages of electronic document are printed on each page in an equal size. In FIGS. 6A and 6B, the range surrounded by a dotted line corresponds to the document image and the circumferential region thereof is the margin. As shown in FIG. 6A, the margin with Y1 and X1 is set on each page.

When the 2-up print of the two pages of document image is made, each document image is printed on the medium. As a result, as shown in FIG. 6B, the origin of a first page of the document image matches with the coordinate (X1,Y1) on the medium indicated by the code image according to the margin set on the document image (Of1) The origin of a second page of the document image matches with the coordinate (X1,Y2) on the medium indicated by the code image according to the margin set on the document image and the arrangement on the medium (Of2). In this case, Y2 is equal to a value obtained by summing up the Y-direction size in the first page of the document image, the margins on upper and lower part, and the margin on an upper part in the second page of the document image. As a result, the position (address) on the document image identified by the application providing a function for the second page of the document image is deviated by X1 toward the X-direction and by Y2 toward the Y-direction from the address on the medium represented by the code image. Accordingly, the correction section 34 corrects the address information of the code image generated by the code image generating section 33 into address information based on the margin setup, and generates a correction value.

In addition, when N-up print is made, the document image is reduced from the original size to be printed on the medium. Accordingly, as described above, when the magnification or reduction is made, the magnification ratio based on the N-up print and the generated correction value are stored in the electronic document information accumulating section 38.

The description of the detailed configuration of the printing section (image forming device) 37 will now be given.

Figure 7:
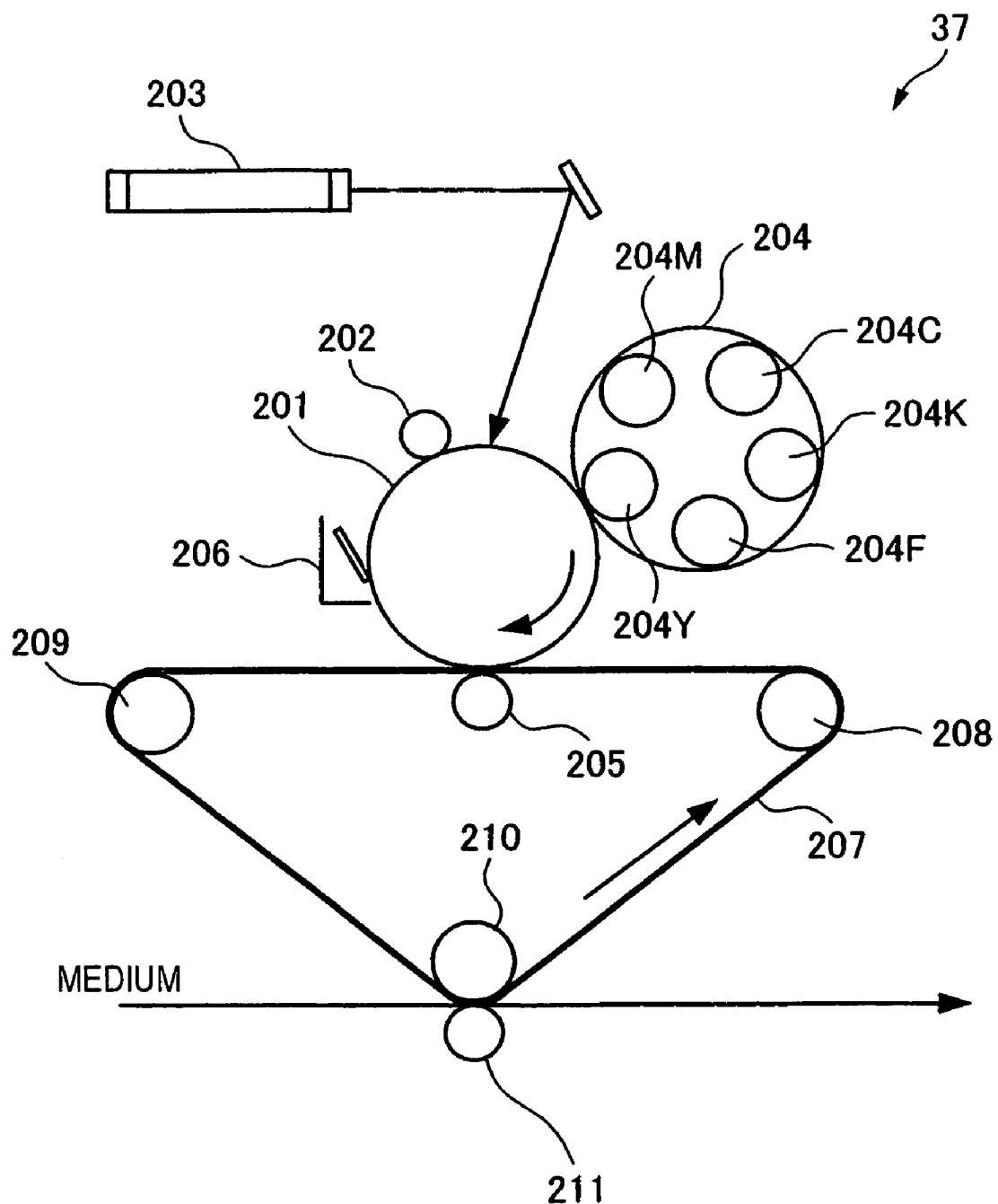
FIG. 7 is a schematic diagram showing the configuration of the printing section (image forming section) according to the embodiment of the invention.

FIG. 7 is a schematic diagram showing the configuration of the printing section (image forming section) 37 that forms visible images and non-visible images simultaneously according to the present embodiment. The printing section 37 shown in FIG. 7 includes an image carrier 201, an electrifier 202, an exposing device 203, a rotary developing device 204, a primary transfer roll 205, a cleaning device 206, an intermediate transfer belt 207, support rolls 208 and 209 of the intermediate transfer belt 207, an opposite roll 210 provided in a secondary transfer section, and a secondary transfer roll 211.

The image carrier 201 is a photosensitive drum having a photosensitive layer on its circumferential surface. The image carrier 201 is provided to be rotatable in a direction of the arrow shown in FIG. 7. The electrifier 202 electrifies a surface of the image carrier 201 uniformly. The exposing device 203 irradiates, for example, a razor beam onto the surface of the image carrier 201 uniformly electrified by the electrifier 202 to form an electrostatic latent image. The rotary developing device 204 includes five developers 204F, 204Y, 204M, 204C, and 204K for receiving a non-visible toner, a yellow toner, a magenta toner, a cyan toner, and a black toner, respectively. In the printing section shown in FIG. 7, since the toners are used as developing agents for forming images, the developers 204F, 204Y, 204M, 204C, and 204K receive the non-visible toner, the yellow toner, the magenta toner, the cyan toner, and the black toner, respectively. The rotary developing device 204 rotates so that the five developers 204F, 204Y, 204M, 204C, and 204K can sequentially approach and face the image carrier 201 to transfer the toners to electrostatic latent images corresponding to each color, thereby forming visible toner images and non-visible toner images.

The primary transfer roll 205 primarily transfers toner images (visible toner images or non-visible toner images) formed on the surface of the image carrier 201 to the outer circumferential surface of the intermediate transfer belt 207 while the intermediate transfer belt 207 is interposed between the primary transfer roll 205 and the image carrier 201. The cleaning device 206 removes toners remaining on the surface of the image carrier 201 after the primary transfer is performed. The intermediate transfer belt 207 is supported by plural support rolls 208 and 209 and an opposite roll 210 so as to rotate in a direction of the arrow shown in FIG. 7. The secondary transfer roll 211 secondarily transfers the toner images transferred on the outer circumferential surface of the intermediate transfer belt 207 onto a medium (paper) transported in a direction of the arrow by a paper transport unit (not shown).

In the printing section 37 constituted in such a manner, the toner images are formed on the surface of the image carrier 201, and then the toner images are transferred to the outer circumferential surface of the intermediate transfer belt 207 in multiple. That is, after the image carrier 201 rotates and the surface of the image carrier 201 is uniformly electrified by the electrifier 202, image light is irradiated by the exposing device 203 onto the image carrier 201 to form an electrostatic latent image. In a process of forming the electrostatic latent image, a non-visible toner image is first formed. That is, after it is developed by the non-visible developer 204F, the toner image is transferred to the outer circumferential surface of the intermediate transfer belt 207 by the primary transfer roll 205. At this time, the non-visible toner which is not transferred to the intermediate transfer belt 207 and remains on the surface of the image carrier 201 is removed by the cleaning device 206. Then, the intermediate transfer belt 207 with the non-visible toner image formed on the outer circumferential thereof is located on a position at which the subsequent yellow toner image is to be stacked and transferred on the non-visible toner image while maintaining the non-visible toner image on the outer circumferential surface of the intermediate transfer belt 207. Subsequently, with respect to magenta, cyan, and black toner images, the electrification process by the electrifier 202, the process of irradiating image light by the exposing device 203, the process of forming toner images by the respective developers 204M, 204C, 204K, and the process of transferring the toner image on the outer circumferential surface of the intermediate transfer belt 207 are sequentially repeated.

As a result, the non-visible toner image and the full-color toner image (visible toner image) constituting four colors of toner images are carried on the outer circumferential surface of the intermediate transfer belt 207. The full-color visible toner image and the non-visible toner image are collectively transferred to a medium (paper) by the secondary transfer roll 211. Accordingly, on a surface of the medium on which an image is formed, a recorded image in which the full-color visible image and the non-visible image are mixed can be obtained. As a result of the sequence in the primary transfer process, the non-visible image is formed on the top layer of the medium. Accordingly, since the non-visible image in which a code image shown in FIGS. 2A and 2B is printed is formed on an upper surface of the visible image on which the document image is printed, reading of the non-visible image is not disturbed by the visible image. Also, instead of the full-color visible image, the visible image may be made of, for example, a monochrome color or a plus one color in which another color is added. As a result, the visible image and the non-visible image are simultaneously formed.

A data structure accumulated in the electronic document information accumulating section 38 of FIG. 1 will now be described.

FIG. 8 is a diagram showing an example of a data structure for managing the correlation between the electronic document and the medium identification information, and information concerning the printing condition. FIG. 8 shows an example of a content accumulated in the electronic document information accumulating section 38. The data structure shown in FIG. 8 has a management ID, an electronic document name, page information, print-out time, an electronic document size, a paper size, the direction of an image, a correction value (X-direction), a correction value (Y-direction), a magnification ratio (%), and N-up information, in which the correlation among them is managed. The management IDs 1 to 6 show six printed pages of A4-sized electronic document. Each page of the printed electronic document is separately managed to have a different management ID (1~6). The management IDs 1 to 6 have the same URL in the electronic document name, and have the page information indicated by 1 to 6. Similarly, the management IDs 7 and 8 have two consecutively printed pages of the electronic document. Also, the management IDs 9 and 10 have two consecutively printed pages of the electronic document.

The present embodiment has a feature that address information of the code image formed on the medium is corrected according to the printing condition, such as the margin setup, the magnification or reduction, and N-up print when the electronic document is printed. In an example shown in FIG. 8, the correction value (X-direction and Y-direction) and information of the magnification ratio concerning the correction of the address information are stored as information concerning the printing condition of the printed electronic document. The value stored in the item 'correction value' is a coordinate value corresponding to the origin of the electronic document printed on the medium among the addresses on the medium indicated by the code image. Here, in the management IDs 9 and 10, the N-up information is '2', and two pages of the electronic document corresponding to the management IDs 9 and 10 are printed on a single medium. As a result, a Y-direction correction value is large for the second page of the electronic document corresponding to the management ID 10, such that the two pages of the electronic document are arranged and printed in the Y-direction. With relation to the example of FIGS. 6A and 6B, Y1 corresponds to a Y-direction correction value (10 mm) of the management ID 9, and Y2 corresponds to a Y-direction correction value (155 mm) of the management ID 10. Also, since the electronic document of the management IDs 9 and 10 is reduced due to the N-up print, the magnification ratio is set to 70%.

In FIG. 8, the print-out time is used as information for specifying the medium. The print-out time is specified for each medium in the printing device 30, such that the medium can be uniquely specified. Since the print-out time is included as identification information in the code image which is printed on the medium, for example, the medium ID, which is individually assigned from a predetermined management server, does not need to be used. Also, the medium identification information is completely different from the ID of the electronic document. For example, when plural copies of the same electronic document are printed, or plural pages of the electronic document are printed in one medium using N-up, it is not possible to match the pages of the electronic document with the medium using the electronic document ID. In the present embodiment, it is possible to identify in units of printed medium and to manage the electronic document in units of medium by causing and printing the medium identification information to be included in the code image. In addition, plural jobs (print-out) cannot be simultaneously executed in a single printing device 30. Accordingly, if a combination of a device ID for identifying the printing device 30 and the print-out time is set as the medium identification information, it will be completely discriminated as medium identification information.

Also, as the medium identification information, there may be used a combination of the device ID for identifying the printing device 30 and information concerning the count number of papers counted by a counter (not shown) of the printing device 30 whenever the papers are printed. When the device ID and the count number are used as the medium identification information, the print-out time does not need to be managed and the amount of information required for the code image can be reduced.

Also, information (for example, user ID) on the user having issued the print instruction, information concerning the name of an organization in which printing is performed, and information concerning the position at which printing is performed may be selected as the medium identification information. For example, the information concerning the user or the organization can be recognized by reading a card if a device is used in which printing can be made by inserting the card. Also, if the personal computer 10 shown in FIG. 1 issues the print instruction, identification information can be identified by information belonging to the personal computer 10.

The pen-type input device 50 will now be described.

Figure 9:
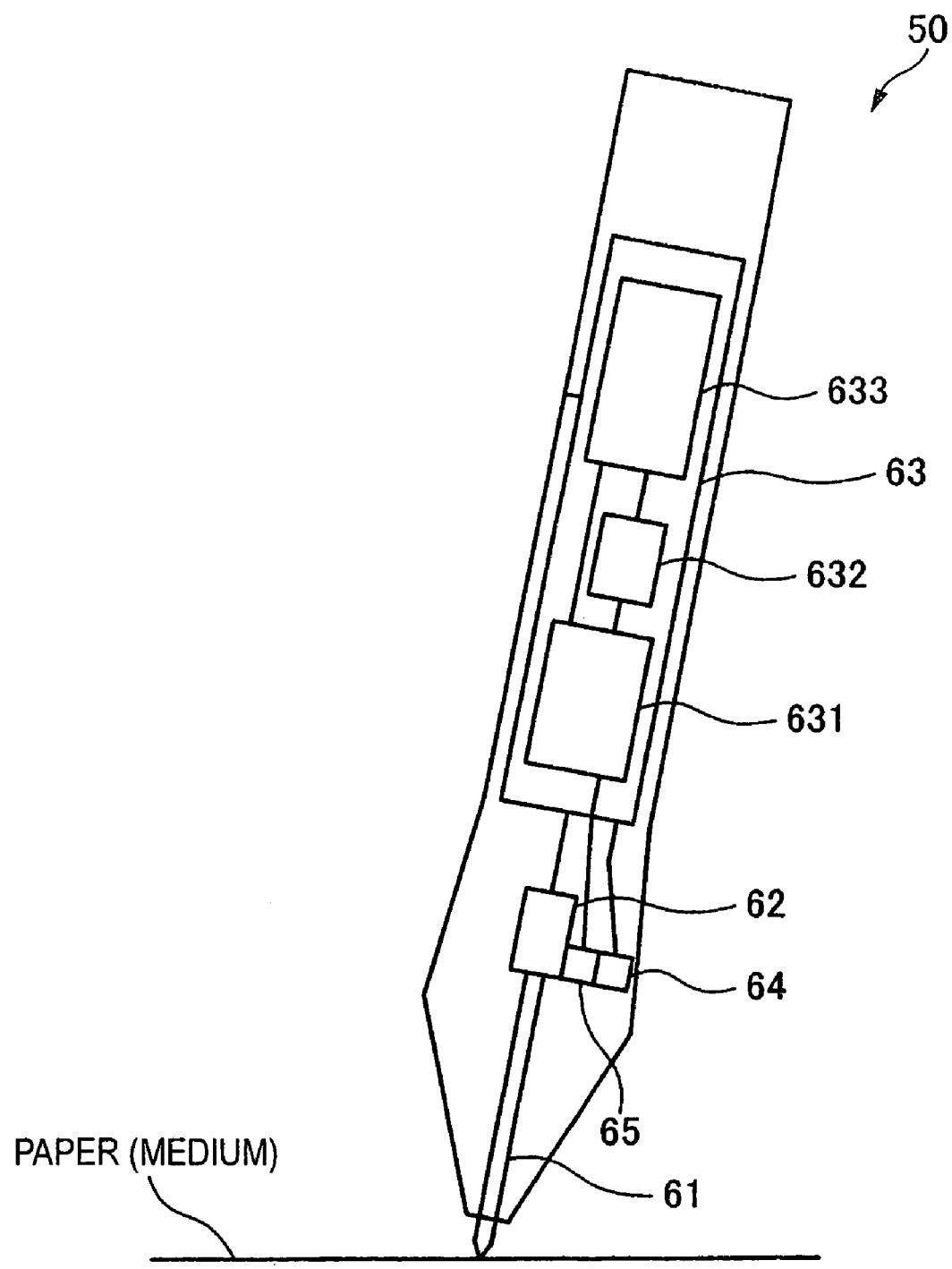
FIG. 9 is a diagram showing the configuration of a pen-type input device according to the embodiment of the invention.

FIG. 9 shows the configuration of the pen-type input device 50. Although the pen-type input device 50 has been primarily described about the function for communication with the printing device 30 in FIG. 1, the overall configuration of the pen-type input device 50 is shown in FIG. 9 including the function of reading the non-visible image.

The pen-type input device 50 includes a writing section 61, such as a pen, that writes characters or figures on the medium (paper), on which the combination of the code image and the document image is printed, and a writing-pressure detecting section 62 that monitors the motion of the writing section 61 and detects the pressure of the pen-type input device 50 applied on the paper. Also, the pen-type input device 50 includes a control section 63 that controls the electronic operation of the pen-type input device 50, an infrared irradiating section 64 that irradiates infrared light in order to read the code image on the paper, and an image input section 65 that complements and inputs the code image onto which infrared light is irradiated.

The control section 63 will now be described in detail.

The control section 63 includes a code acquiring section 631, a trajectory calculating section 632, and an information storing section 633. The code acquiring section 631 interprets an image inputted from the image input section 65 and acquires a code. The trajectory calculating section 632 calculates a trajectory of the pen point by correcting a difference between the coordinate of the pen point of the writing section 61 and the coordinate of an image complemented by the image input section 65 with respect to the code acquired by the code acquiring section 631. The information storing section 633 stores the code acquired by the code acquiring section 631 or the trajectory information calculated by the trajectory calculating section 632.

Figure 10:
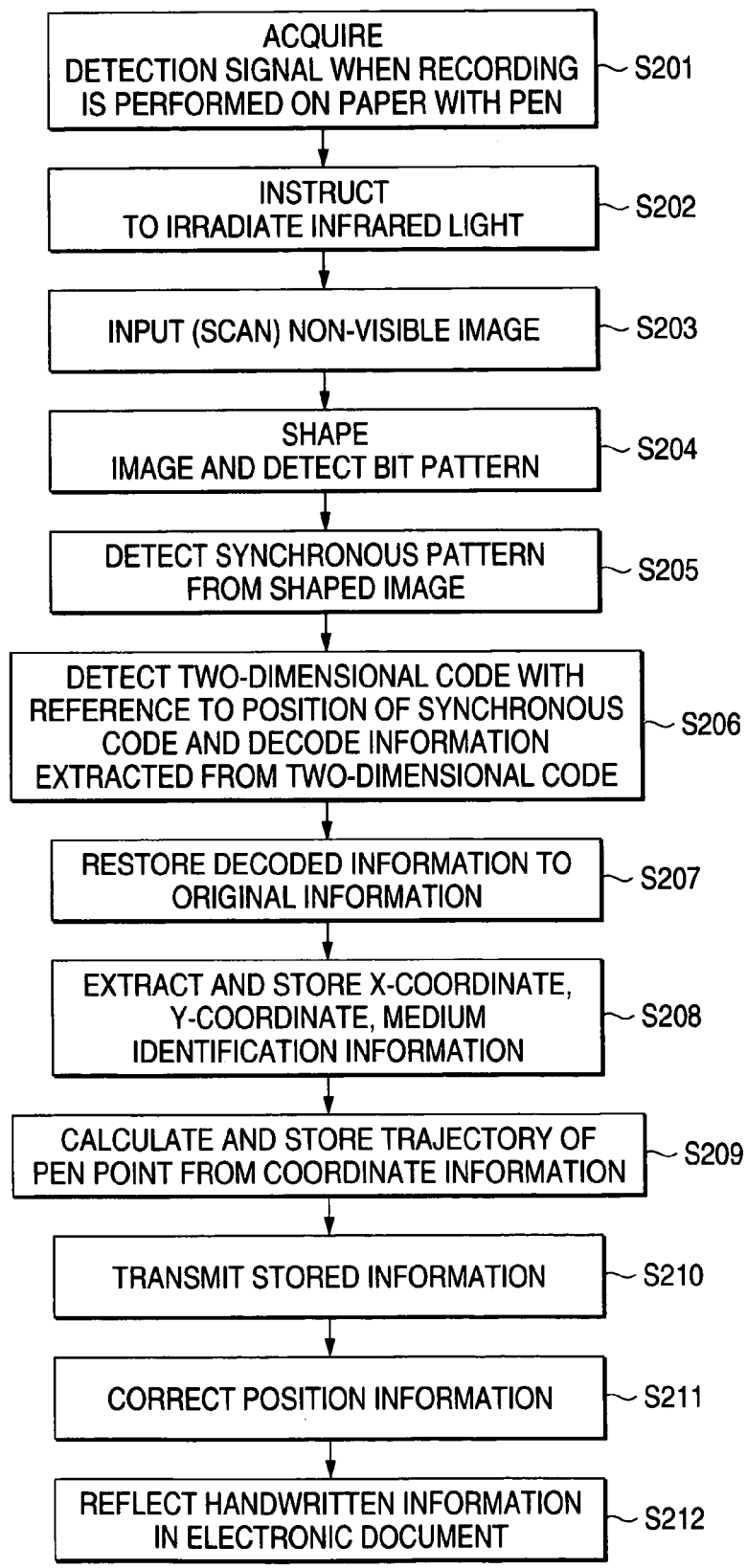
FIG. 10 is a flow chart showing a process, which is primarily executed by a control section of a pen-type input device according to the embodiment of the invention.

FIG. 10 is a flow chart showing a process, which is executed primarily in the control section 63 of the pen-type input device 50. In FIG. 10, the steps S211 and S212 indicate a process in which the electronic document managing section 31 processes the information read by the pen-type input device 50.

In the pen-type input device 50, for example, when characters or figures are recorded on the paper, the control section 63 acquires a detection signal, indicating that recording is performed on the paper with the pen, from the writing-pressure detecting section 62 (Step S201). Upon detecting the detection signal, the control section 63 instructs the infrared irradiating section 64 to irradiate infrared light onto the paper (Step S202). Infrared light irradiated onto the paper by the infrared irradiating section 64 is absorbed by the non-visible image. The image input section 65 complements the code image onto which infrared light is irradiated. The control section 63 inputs (scans) the non-visible image through the image input section 65 (Step S203).

Subsequently, the code acquiring section 631 of the control section 63 performs a process of detecting the code image represented in the steps S204 to S210. First, the inputted scan image is shaped. Shaping of the scan image implies gradient correction or noise removal. A bit pattern (a slant line pattern), such as slash '/' or backslash '\', is detected from the shaped scan image (Step S204). In addition, a synchronous code, which is a code for determining a position of the two-dimensional code, is detected from the shaped scan image (Step S205). The code acquiring section 631 detects the two-dimensional code with reference to the position of the synchronous code, and information, such as an ECC (Error Correcting Code) or the like, is extracted from the two-dimensional code and then is decoded (Step S206). The decoded information is restored to original information (Step S207).

The code acquiring section 631 of the control section 63 reads an X-coordinate and a Y-coordinate (which are referred to as address information), and medium identification information from the code information restored in such a manner, and stores them in the information storing section 633 (Step S208). On the other hand, the trajectory calculating section 632 calculates the trajectory of the pen point from the coordinate information stored in the information storing section 633, and stores the trajectory in the information storing section 633 (Step S209). The identification information, the address information, or trajectory information stored in the information storing section 633 is transmitted to an external device via the communication function shown in FIG. 1 (Step S210).

The stored information transmitted from the pen-type input device 50 is processed by the electronic document managing section 31 of the printing device 30 (Steps S211 and S212). For example, writing information by the pen-type input device 50 is added to electronic information specified by the medium identification information, such that synthesized information of the writing information and the electronic information is displayed on the display device (not shown). Also, the writing information may be stored as corrected information of the original electronic document stored in the repository. Also, when writing is performed again after writing is first performed, the corrected information may be also read in addition to the original electronic document, such that new writing information may be added to the electronic document including the corrected information.

When the electronic document managing section 31 processes the stored information transmitted from the pen-type input device 50, information concerning the printing condition stored in the electronic document information accumulating section 38 is used as a reference. The position information (trajectory information) of the pen point calculated in the trajectory calculating section 632 of the pen-type input device 50 is corrected based on the correction value (X-direction, Y-direction) shown in FIG. 8 (Step S211). In addition, when the magnification ratio among the printing condition information is other than 100%, the lengths in X-direction and Y-direction in the trajectory information are changed based on the magnification. For example, in the electronic document of the management IDs 9 and 10 of FIG. 8, the magnification ratio is 70%. Accordingly, the lengths in X-direction and Y-direction are changed to 70%. As described above, the handwritten information of the pen-type input device 50 properly corrected is reflected in the electronic document with respect to the trajectory information indicating a handwritten image for the medium (Step S212).

After the above-mentioned correction is made in the electronic document managing section 31 of the printing device 30, the trajectory information of the pen point is recorded on the pen trajectory recording section 39. As a result, the handwritten information recorded on the pen trajectory recording section 39 is reflected, such that a handwritten image displayed on a display device and an image actually handwritten on the medium match each other.

Next, the system configuration different from that shown in FIG. 1 will now be described.

Figure 11:
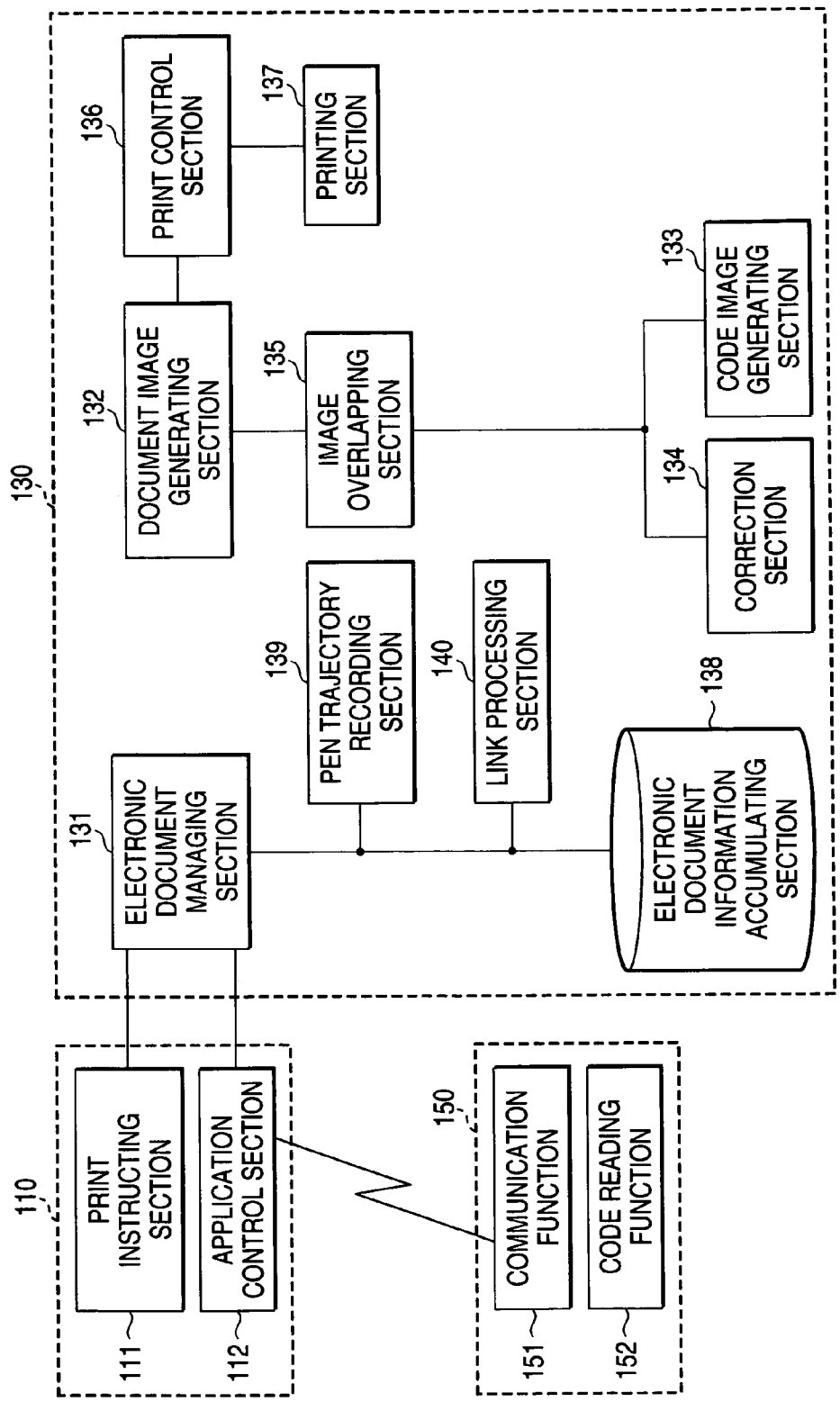
FIG. 11 is a diagram showing another configuration of an electronic document management system.

FIG. 11 shows another configuration of an electronic document management system. The electronic document management system shown in FIG. 11 includes a personal computer 110, a printing device 130, and a pen-type input device 150.

The personal computer 110 includes a print instructing section 111 and an application control section 112 which has the same function as the print instructing section 11 and the application control section 12 of the personal computer 10 shown in FIG. 1. The printing device 130 includes an electronic document managing section 131, a document image generating section 132, a code image generating section 133, a correction section 134, an image overlapping section 135, a print control section 136, a printing section 137, an electronic document information accumulating section 138, a pen trajectory recording section 139, and a link processing section 140, which are respectively similar to the electronic document managing section 31, the document image generating section 32, the code image generating section 33, the correction section 34, the image overlapping section 35, the print control section 36, the printing section 37, the electronic document information accumulating section 38, the pen trajectory recording section 39, and the link processing section 40 provided in the printing device 30 shown in FIG. 1. The pen-type input device 150 includes a communication function 151 and a code reading function 152, which are respectively similar to the communication function 51 and the code reading function 52 provided in the pen-type input device 50 shown in FIG. 1.

The communication function 151 of the pen-type input device 150 communicates with the application control section 112 of the personal computer 110 in the system configuration shown in FIG. 11, while the communication function 51 of the pen-type input device 50 shown in FIG. 1 communicates with the printing device 30. Moreover, the detailed configuration of the pen-type input device 150 may be the same as that of the pen-type input device 50 shown in FIG. 9.

In the electronic document management system shown in FIG. 11, a print image including a code image is formed using the above-described configuration as shown in FIG. 4. At this time, as described concerning the system shown in FIG. 1, the code image generated by the code image generating section 33 is properly corrected by the correction section 34 based on information concerning the printing condition, such as the margin setup, the magnification setup, or the N-up print mode at the time of printing the electronic document.

When recording or designation is made on a surface of the paper (medium), on which the print image is formed, using the pen-type input device 150, which is identical to the pen-type input device 50 shown in FIG. 9, the information is transmitted to the printing device 130 through the application control section 112 of the personal computer 110. In the printing device 130, by using content (including the correction value) read from the electronic document information accumulating section 138, the trajectory of the pen-type input device 150 is recorded, or a process for link designation by the pen-type input device 150 is performed.

Next, the system configuration different from that shown in FIGS. 1 and 11 will now be described.

Figure 12:
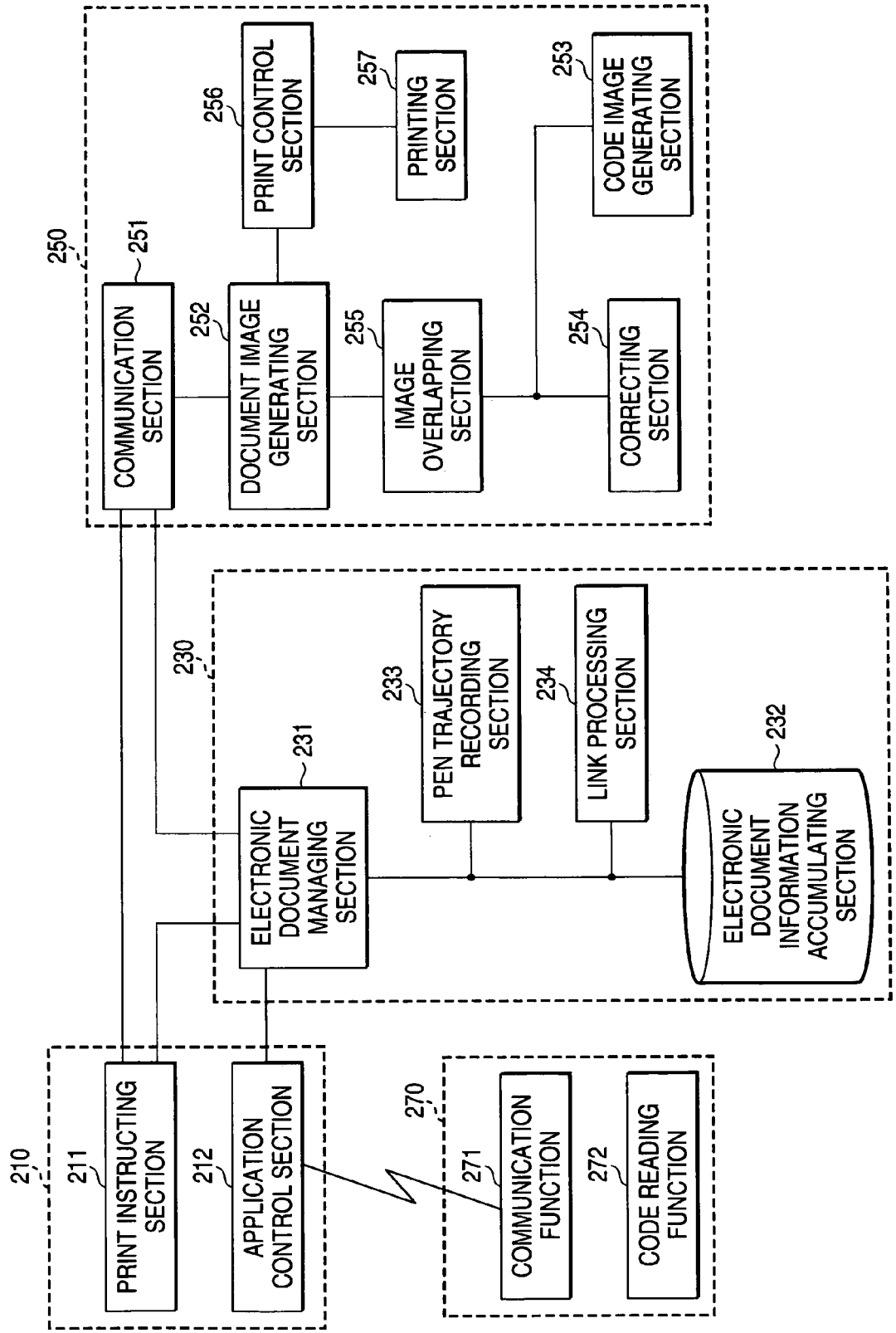
FIG. 12 is a diagram showing another configuration of an electronic document management system.

FIG. 12 shows another configuration of an electronic document management system. The electronic document management system shown in FIG. 12 has a feature that an electronic document management device 230 and a printing device 250 are separated from each other. The system shown in FIG. 12 includes a personal computer 210, an electronic document management device 230, a printing device 250, and a pen-type input device 270.

The personal computer 210 includes a print instructing section 211 and an application control section 212, which respectively have the same functions as the print instructing section 11 and the application control section 12 of the personal computer 10 shown in FIG. 1. Moreover, although the print instructing section 211 and the application control section 212 are provided in the same personal computer 210 in the example of FIG. 12, they may be separately provided in different personal computers such as a print instructing PC and an application providing PC.

The pen-type input device 270 includes a communication function 271 that communicates with an external device, which is similar to the communication function 51 of the pen-type input device 50 shown in FIG. 1. However, the communication function 271 communicates with the application control section 212 of the personal computer 210 in the example shown in FIG. 12 like the system shown in FIG. 11, while the communication function 51 communicates with the printing device 30 in the example shown in FIG. 1. Also, the pen-type input device 270 shown in FIG. 12 includes a code reading function 272 which reads and interprets code information. Moreover, the detailed configuration of the pen-type input device 270 may be the same as that of the pen-type input device 50 shown in FIG. 9.

The electronic document management device 230 includes an electronic document managing section 231 that manages the correlation between generated addresses and electronic documents, and an electronic document information accumulating section 232 that accumulates a data structure, as shown in FIG. 8, for example, the correlation between electronic documents and medium identification information, and information concerning the printing condition. Also, the electronic document management device 230 includes a pen trajectory recording section 233 that records a pen trajectory made by a user, and a link processing section 234 that performs a process about link information set in the electronic documents. The electronic document management device 230 having such functions may be provided in a server different from or equal to a server for a repository connected to a network in order to provide the electronic documents. Also, in the example shown in FIG. 12, the electronic document management device 230 is provided separately from the printing device 250, unlike the system configurations shown in FIGS. 1 and 11.

The printing device 250 includes a communicating section 251 that receives a print instruction from the print instructing section 211 of the personal computer 210 and acquires electronic documents from the repository via the network. The communicating section 251 can specify and acquire electronic documents to be printed, for example, using a URL included in the print instruction. The communicating section 251, after printing, also outputs the correlation information between the electronic documents and the medium identification information, which is printed on the medium as a code image, to the electronic document management device 230.

Also, the printing device 250 includes a document image generating section 252, a code image generating section 253, a correction section 254, an image overlapping section 255, a print control section 256, and a printing section 257, like the printing device 30 shown in FIG. 1. The document image generating section 252 generates a document image from an electronic document acquired through the communicating section 251. The code image generating section 253 generates a code image that describes consecutive address information or medium identification information printed on the medium by a predetermined code pattern. The correction section 254 corrects the code information based on the printing condition of the electronic document. The image overlapping section 255 overlaps the document image generated by the document image generating section 252 and the code image generated by the code image generating section 253 each other to generate a final printing image. The print control section 256 controls the printing section 257 to print the print image generated by the image overlapping section 255 on the medium.

In the electronic document management system shown in FIG. 12, a print image including a code image is formed using the above-described configuration as shown in FIG. 4. As described above, in the system shown in FIG. 1, the code image generated by the code image generating section 33 is properly corrected by the correction section 34 based on the information concerning the printing condition, such as the margin setup, the magnification setup, or the N-up print at the time of printing the electronic document.

When writing or designating is performed using the same pen-type input device 270 as the pen-type input device 50 shown in FIG. 9 on the surface of the paper (medium), on which the print image is formed, that information is transmitted to the electronic document management device 230 through the application control section 212 of the personal computer 210. The electronic document management device 230 records the trajectory of the pen-type input device 270 or processes the link designation by the pen-type input device 270 using the content (including a correction value) read from the electronic document information accumulating section 232.

As apparent from the above description, according to the present embodiment, the code image that describes the address information and the medium identification information formed on the medium is corrected based on the information concerning the printing condition, such as the margin setup, the magnification setup, or the N-up print, and the correction information is preserved. When the information concerning the moving trajectory of the pen point of the pen-type input device or link designation from the reading information of the code image printed on the medium is acquired, the acquired information is corrected based on the preserved correction information. Accordingly, even when the margin setup, the magnification or reduction of an image, or N-up print is made at the time of printing the electronic document, it is possible to match the position obtained from the reading information of the code pattern and the position identified by the application each other, thereby correctly inputting the handwritten image.

Further, according to the present embodiment, when the correction information for the code image is accumulated and the code image printed on the medium is read, the reading information is converted based on the correction information. However, when the code image is generated, the address information described by the code image based on the correction information may be changed. As a result, the address (coordinate value) read from the code image printed on the medium matches with a coordinate identified by the application that processes the electronic information of the handwritten image.

As described above, the invention has a feature that correction information is generated from information concerning a printing condition at the time of printing an electronic document on a medium, and position information of a code image is corrected based on the correction information at the time of reading or generating the code image. According to an aspect of the invention, there is provided an electronic document management system.

The electronic document management system includes a receiving unit that receives a print instruction, an electronic document management unit, a code image generation unit, a correction unit, an accumulating unit, a printing unit, and a code image reading unit, which operate according to the received print instruction. The electronic document management unit manages the correlation between address information, which is printed on a surface of a medium on which an electronic document is printed to specify the position of the surface of the medium, and the electronic document. The code image generation unit generates a code image printed on the medium based on the address information. The correction unit generates correction information for describing the difference between a position of the electronic document on a document image and a position on the medium by the code image, with respect to the code image. The accumulating unit accumulates information managed by the electronic document management unit and the correction information generated by the correction unit. The printing unit prints the generated code image and the generated image of the electronic document on a surface of the medium. The code image reading unit reads the code image printed on the surface of the medium on which the electronic document is printed.

In this case, the code image reading unit may be separately provided from the other units. The code image reading unit may read a code image printed on a position on a medium specified by the operation of a user on the surface of the medium. In addition, the electronic document management unit and the accumulating unit, which manage the electronic document and the correction information, may be separately provided from the code image generation unit, the correction unit, and the printing unit, which operate at the time of printing the electronic document and the code image.

In the above-mentioned electronic document management system according to the invention, the electronic document management unit inputs reading information of a code image read by the code image reading unit, and corrects position information obtained from the reading information based on the correction information accumulated in the accumulating unit so that a position of the electronic document on a document image and a position on the medium by the code image can match each other.

In addition, the correction information includes at least address information that represents the corresponding position on the medium in respect to the specific position on the document image. The electronic document management unit makes a correction based on the magnification ratio at the time of printing the electronic document on the medium, in addition to the correction information. Further, the magnification ratio may be included in the correction information.

The correction unit generates the correction information, for example, based on the margin setup and the magnification ratio at the time of printing the electronic document on the medium. In addition, when plural pages of electronic document are printed on a single sheet of the medium, the correction unit generates the correction information based on the arrangement of each page on the medium and the magnification ratio.

According to another aspect of the invention, there is provided an electronic document management method performed by the electronic document management system. The method includes reading a code image that is printed, together with an electronic document, on a surface of a medium on which the electronic document is printed, and describes address information for specifying at least the position of the surface of the medium, inputting reading information of the code image to acquire position information from the reading information, correcting the position information based on correction information that describes the difference between a position of the electronic document on a document image and a position on the medium by the code image so that a position on the document image and a position on the medium by the code image can match each other, and reflecting the corrected position information in the electronic document.

According to still another aspect of the invention, there is provided a program that control a computer to function as the above-mentioned system, or a program that allows the computer to execute processes corresponding to the respective steps of the management method. The program may be stored in a magnetic disk or an optical disk, a semiconductor memory, or other storage mediums and be distributed. Alternatively, the program may be offered over a network.

According to the invention, it maybe possible to generate correction information based on information concerning a printing condition, such as the margin setup, magnification ratio, or N-up print mode at the time of printing an electronic document, and to correct reading information of a code image based on the correction information. As a result, even when the margin setup, the N-up print, or the image magnification or reduction is made, it may be possible to match the position obtained from the reading information of the code pattern and the position identified by an application each other, thereby accurately inputting a handwritten image.

The entire disclosure of Japanese Patent Application No. 2005-175423 filed on Jun. 15, 2005 including specification, claims, drawings and abstract is incorporated herein by reference in its entirety.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be solely defined by the following claims and their equivalents.

What is claimed is:

1. An electronic document management system comprising:
    an electronic document management unit
    an accumulating unit that accumulates correction information in connection with a medium on which code image including address information and an image of an electronic document are printed, wherein
        the address information of each code image specifies a corresponding position on a surface of the medium, and
        the correction information describes a difference between a first certain position in the printed image of the electronic document and a second certain position on the medium, the second certain position being specified by the address information of one of the printed code images; and
    a code image reading unit that reads the code images from the medium to obtain position information from the read code images, wherein
    the electronic document management unit corrects the position information based on the correction information accumulated in the accumulating unit so that the first certain position in the printed image of the electronic document matches with the second certain position on the medium.

2. The electronic document management system according to claim 1,
    wherein the electronic document management unit inputs the reading information of the code image read by the code image reading unit.

3. The electronic document management system according to claim 1, further comprising:
    a first device that functions as the code image reading unit; and a second device that functions as the accumulating unit and the electronic document management unit,
    wherein the first device reads the code image that is specified by an operation of a user on the surface of the medium.

4. The electronic document management system according to claim 1,
    wherein the correction information includes at least the address information indicating a position on the medium that corresponds to a specific position on the document image.

5. The electronic document management system according to claim 1,
    wherein the electronic document management unit performs a correction based on a magnification ratio of the electronic document on the medium, in addition to the correction information.

6. An electronic document management system comprising:
    a receiving unit that receives a print instruction to print an electronic document;
    an electronic document management unit
    a code image generating unit that generates a code image printed on the medium based on address information;
    a correction unit that generates correction information describing a difference between a first certain position of the electronic document on a document image and a second certain position on the medium, with respect to the code image generated by the code image generating unit;
    a code image reading unit that reads the code images from the medium to obtain position information from the read code images;
    an accumulating unit that accumulates information managed by the electronic document management unit and the correction information generated by the correction unit; and
    a printing unit that prints the generated code image and an image of the electronic document on the surface of the medium.

7. The electronic document management system according to claim 6,
    wherein the electronic document management unit inputs reading information of the code image read by the code image reading unit, and corrects position information obtained from the reading information based on the correction information generated by the correction unit.

8. The electronic document management system according to claim 6,
wherein the code image reading unit reads the code image that is specified by an operation of a user on the surface of the medium.

9. The electronic document management system according to claim 6,
wherein the correction information includes at least the address information indicating a position on the medium that corresponds to a specific position on the document image.

10. The electronic document management system according to claim 6,
wherein the correction unit generates the correction information based on margin setup of the electronic document on the medium.

11. The electronic document management system according to claim 6,
wherein the correction unit generates the correction information based on a magnification ratio of the electronic document on the medium.

12. The electronic document management system according to claim 6,
wherein when a plurality of pages of the electronic document are printed on a single sheet of the medium, the correction unit generates the correction information based on an arrangement of each page on the medium and a magnification ratio.

13. An image forming device comprising:
a code image generating unit that generates a code image based on address information for specifying a corresponding position of a surface of the medium on which an electronic document is printed;
a correction unit that generates correction information describing a difference between a first certain position in the printed image of the electronic document and a second certain position on the medium, with respect to the code image generated by the code image generating unit; and
a printing unit that prints the generated code image and an image of an electronic document on the surface of the medium.

14. The image forming device according to claim 13, further comprising:
an output unit that outputs a correlation between the address information and the electronic document, and correction information generated by the correction unit.

15. The image forming device according to claim 13,
wherein the correction information includes at least an address on the medium corresponding to an origin on the document image.

16. The image forming device according to claim 15,
wherein the correction information further includes:
a magnification ratio of the electronic document on the medium.

17. An electronic document management method comprising:
reading a code image that is printed on a surface of a medium together with an electronic document, and describes at least address information for specifying a corresponding position of the surface of the medium, the electronic document being printed on the medium;
inputting reading information of the code image to acquire position information from the reading information;
correcting the position information based on correction information that describes a difference between a first certain position in the printed image of the electronic document and a second certain position on the medium so that the first certain position in the printed image of the electronic document and the second certain position on the medium match each other; and
reflecting the corrected position information in the electronic document.

18. The electronic document management method according to claim 17,
wherein the correction information includes at least the address information indicating a position on the medium that corresponds to a specific position on the document image.

19. A storage medium readable by a computer, the storage medium storing a program of instructions executable by the computer to perform a function, the function comprising the steps of:
managing a correlation between address information that is printed on a surface of a medium to specify a position of the surface of the medium and the electronic document, the electronic document being printed on the medium;
accumulating correction information in connection with the medium, the correction information describing a difference between a first certain position in the printed image of the electronic document and a second certain position on the medium, the second certain position being specified by the address information of one of the printed code images and
inputting reading information of the code image to correct position information obtained from the reading information based on the accumulated correction information so that a first certain position in the printed image of the electronic document matches with a second certain position on the medium.

20. The storage medium according to claim 19,
wherein the correction information includes at least the address information indicating a position on the medium that corresponds to a specific position on the document image.

21. The storage medium according to claim 20,
wherein the correction information further includes: a magnification ratio of the electronic document on the medium.

* * * * *